E. J. BURDICK.
INSULATOR BLOCK CABLE BRACKET HANGER.
APPLICATION FILED JUNE 4, 1915.
1,227,111.
Patented May 22, 1917.
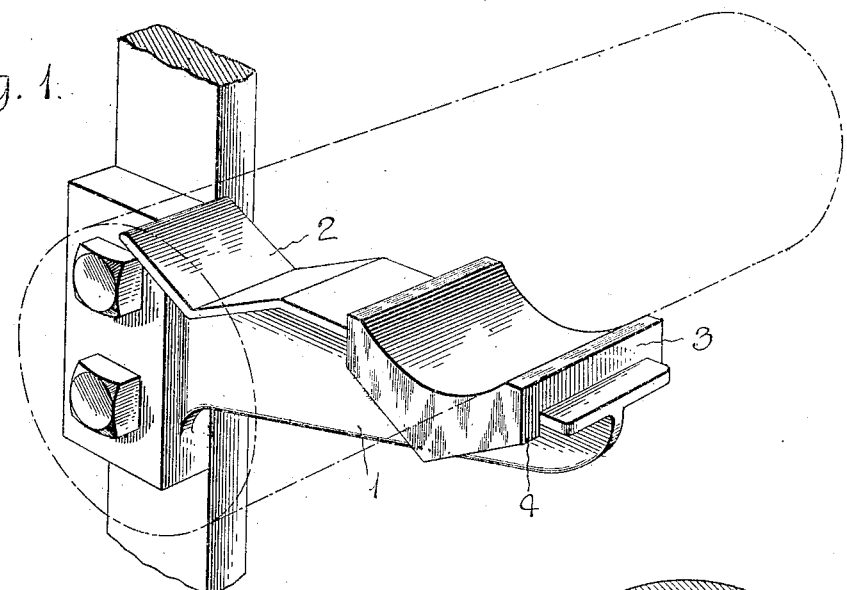
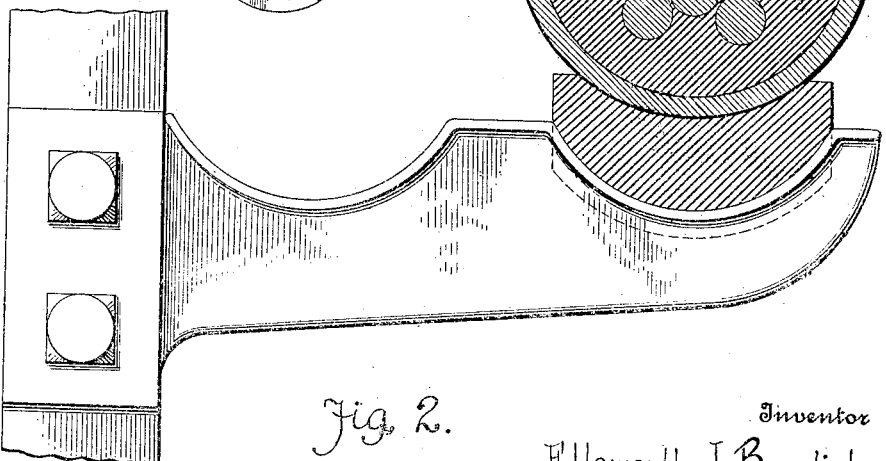

UNITED STATES PATENT OFFICE.

ELLSWORTH J. BURDICK, OF DETROIT, MICHIGAN.

INSULATOR-BLOCK CABLE BRACKET-HANGER.

1,227,111.      Specification of Letters Patent.      Patented May 22, 1917.

Application filed June 4, 1915. Serial No. 32,068.

*To all whom it may concern:*

Be it known that I, ELLSWORTH J. BURDICK, a citizen of the United States of America, residing at Detroit, in the county of Wayne and State of Michigan, have invented certain new and useful Improvements in Insulator-Block Cable Bracket-Hangers, of which the following is a specification, reference being had therein to the accompanying drawings.

In supporting heavily armored cables in electrical construction and more particularly underground work, it is usual to provide brackets, cable hangers or supports having seats upon which the cables are placed. If for any reason there is a breakdown caused by short circuit or leakage in any of the cables, the exterior armor either of that cable or of the others, frequently of lead or the like that in the customary construction, is contacted with the metal support, becomes grounded or short-circuited and burned away.

This invention relates to installation for armored or lead covered cables and to an arrangement thereof, whereby the cable is mounted without particular trouble more than the slipping of an insulating member into place, the parts being so disposed that the insulator automatically engages with the bracket or cable hanger under the weight of the cable and retains its position against vibration or other causes which would displace it.

This insulator also protects the armor of a supported cable from contact with the bracket or cable support and against all stray currents, auto-electrolysis or galvanic action that might otherwise take place.

In the drawings,

Figure 1 is a view of a type of cable hanger or bracket provided with an insulating member that embodies features of the invention, a superposed cable being shown in outline;

Fig. 2 is a view of a modified form of bracket with a correspondingly modified form of the insulator shown in section together with a cable resting thereon also in section;

Fig. 3 is a view in detail of the insulator used with the modified form of bracket, and Fig. 4 is a view in detail in section of the preferred form of insulator for the preferred form of bracket shown in Fig. 1.

Referring to the drawings, a cable bracket or support is formed of a suitably ribbed and flanged body or arm 1 arranged to be secured in any appropriate manner to an upright as indicated in Fig. 1. As the bracket does not *per se* form a part of the invention, the manner of securing the same and the general conformation thereof is immaterial, provided the upper face of the bracket has the usual seat for a cable. As herein shown in the preferred form of Fig. 1, these are broad V-shaped depressions indicated at 2.

An insulating block 3 of suitable material, preferably of porcelain or like vitreous substance, has a pair of depending flanges 4 on the end faces thereof that are adapted to embrace the upper face or tread of a bracket when the insulating block is placed thereon, the surface of the insulator between the flanges being shaped to conform to the depression or valley in the bracket. Or, if the brackets have the rounded depressions indicated in Fig. 2, the contour on the under surface of the insulating block is correspondingly changed as indicated in Fig. 3.

In either instance, an insulating block is obtained that is readily placed in position without the use of special tools, that maintains its position under the weight of the applied cables and that effectively prevents any short circuiting because of contact of the outer armor of the cable with the body of the bracket.

Obviously, changes in the details of construction may be made without departing from the spirit of my invention and I do not care to limit myself to any particular form or arrangement of parts.

What I claim is:—

A cable support, comprising an arm having the upper edge thereof provided with a seat portion having separated transverse seats, each being V-shaped, an insulator adapted for supporting a cable and having the bottom thereof provided with inclined walls corresponding in area to the inclined walls of the seat and adapted to rest thereon, said insulator having flanges on the end thereof depending below the seat portion of said arm and engaging the edges thereof to prevent displacement of said insulator relative to the seat portion of said arm.

In testimony whereof I affix my signature in presence of two witnesses.

ELLSWORTH J. BURDICK.

Witnesses:
OTTO F. BARTHEL,
ANNA M. DORR.